(12) United States Patent
Seres, Jr. et al.

(10) Patent No.: US 7,458,795 B2
(45) Date of Patent: Dec. 2, 2008

(54) CO-INJECTION NOZZLE ASSEMBLY

(75) Inventors: Eric J. Seres, Jr., Rochester Hills, MI (US); John Blundy, White Lake, MI (US); Michael Goinski, Rimpar (DE)

(73) Assignee: INCOE Corporation, Troy, MI (US)

( * ) Notice: Subject to any disclaimer, the term of this patent is extended or adjusted under 35 U.S.C. 154(b) by 168 days.

(21) Appl. No.: 11/361,123

(22) Filed: Feb. 24, 2006

(65) Prior Publication Data

US 2007/0202210 A1  Aug. 30, 2007

(51) Int. Cl.
B29C 45/23  (2006.01)
(52) U.S. Cl. ........................ 425/130; 425/564
(58) Field of Classification Search ................ 425/130, 425/131.1, 131.5, 133.1, 562, 563, 564
See application file for complete search history.

(56) References Cited

U.S. PATENT DOCUMENTS

| | | | |
|---|---|---|---|
| 4,376,625 A | 3/1983 | Eckardt | |
| 4,470,936 A | 9/1984 | Potter | |
| 4,701,292 A | 10/1987 | Valyi | |
| 4,710,118 A | 12/1987 | Krishnakumar et al. | |
| 4,717,324 A | 1/1988 | Schad et al. | |
| 4,808,101 A | 2/1989 | Schad et al. | |
| 4,895,504 A | 1/1990 | Kudert et al. | |
| 5,028,226 A | 7/1991 | De'ath et al. | |
| 5,094,603 A | 3/1992 | Gellert | |
| 5,221,507 A | 6/1993 | Beck et al. | |
| 5,223,275 A | 6/1993 | Gellert | |
| 5,238,378 A | 8/1993 | Gellert | |
| 5,249,493 A | 10/1993 | Breton | |
| 5,269,677 A | 12/1993 | Gauler | |
| 5,288,225 A * | 2/1994 | Schmidt et al. | 425/564 |
| 5,429,493 A | 7/1995 | Gauler | |
| 5,641,526 A | 6/1997 | Gellert | |
| 5,651,998 A | 7/1997 | Bertschi et al. | |
| 5,882,693 A | 3/1999 | Silkowski et al. | |
| 5,935,614 A | 8/1999 | Blank et al. | |
| 5,972,258 A | 10/1999 | Sicilia | |
| 6,276,914 B1 | 8/2001 | Sicilia | |
| 6,305,923 B1 | 10/2001 | Godwin et al. | |
| 6,350,401 B1 | 2/2002 | Gellert et al. | |
| 6,382,946 B1 | 5/2002 | Beck et al. | |
| 6,524,089 B1 | 2/2003 | Nightingale | |
| 6,558,148 B1 | 5/2003 | Seres | |
| 6,575,729 B2 | 6/2003 | Godwin et al. | |
| 6,764,292 B2 | 7/2004 | Hendry | |
| 6,764,297 B2 | 7/2004 | Godwin et al. | |
| 6,872,895 B2 | 3/2005 | Cochran et al. | |
| 2004/0265422 A1 | 12/2004 | Sabin et al. | |

* cited by examiner

Primary Examiner—Tim Heitbrink
(74) Attorney, Agent, or Firm—Butzel Long

(57) ABSTRACT

A gate adapter for use in a hot runner co-injection molding system includes a hollow gate adapter body defining a gate outlet at a free end thereof. At least a pair of nozzle assemblies is disposed in the adapter body, each of nozzle assemblies having an inlet end in fluid communication with a source of liquid extruded material and an outlet end in the adapter body. At least a pair of nozzle passages is formed in the adapter body and extends from the outlet of the nozzle assemblies to a passage outlet adjacent the gate outlet. A valve stem is disposed adjacent each of the passage outlets and is operable to selectively allow flow from the passage outlets to the gate outlet. The nozzle passages extend for a short predetermined distance within the adapter body to minimize heat transfer.

20 Claims, 7 Drawing Sheets

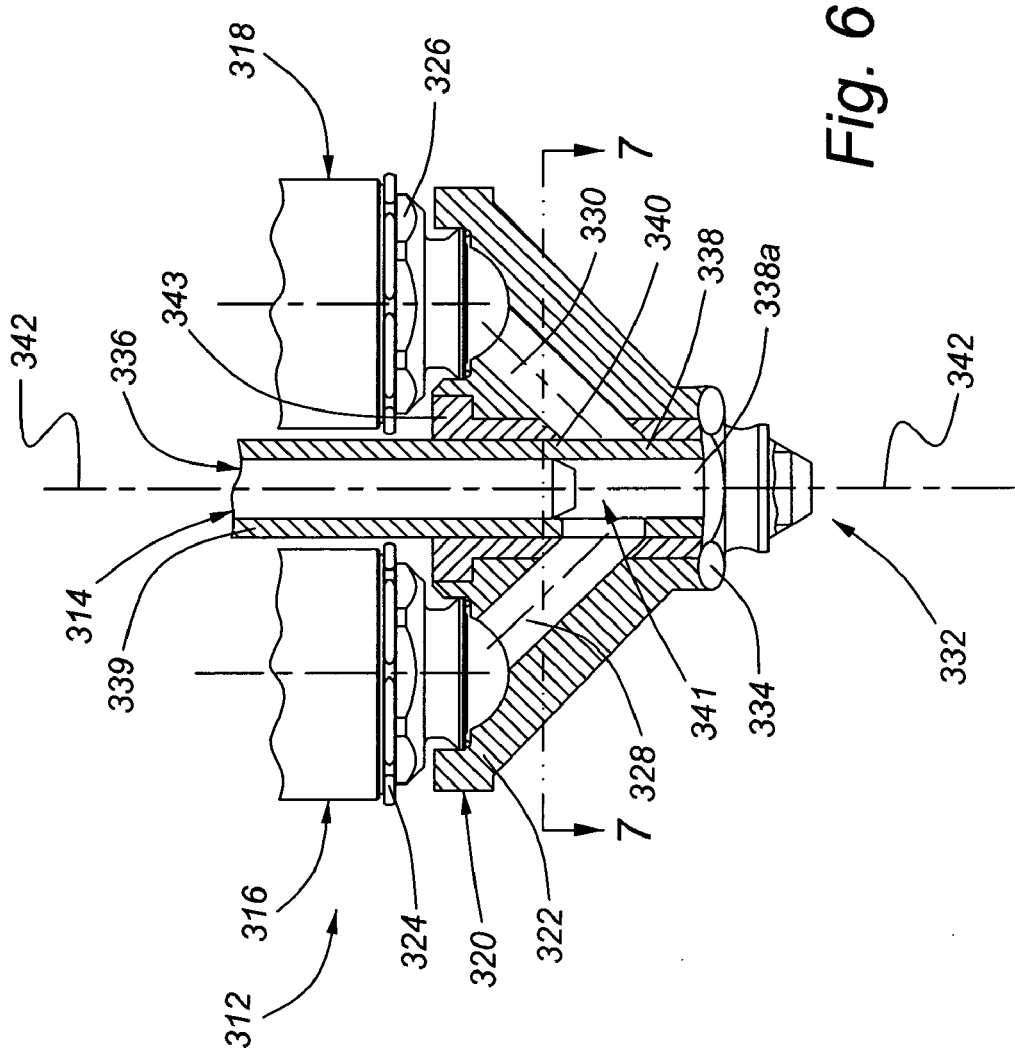

CO-INJECTION NOZZLE ASSEMBLY

BACKGROUND OF THE INVENTION

The present invention relates generally to co-injection molding systems and, in particular to co-injection nozzle assembly with reduced heat transfer between the co-injection molding products.

Injection molds typically comprise stationary and moving mold halves (i.e., the core side and the cavity side) which are closed and clamped together to form a mold cavity therebetween for shaping articles from thermoplastic compositions. The thermoplastic is heated into a molten condition and is injected under pressure through a nozzle and into the mold cavity by means of a screw ram. Injection pressures of 2,000 to 10,000 psi are common at the gate locations. The plastic is allowed to cool to sufficiently harden the thermoplastic whereupon the mold is opened and the hardened articles are removed.

Hot runner manifold systems are well known and are used to convey the synthetic-material melt, plastified by heating, into a plurality of individual sprue bushings positioned in mold plates of the injection-molding system. The manifolds keep the plastic material in a fluid condition while the material flows from the injection machine nozzle through the sprue bushings and into the mold cavity. Hot runner manifold systems provide for use of a plurality of sprue bushings and multi-cavity molds and thus allow increased manufacture of more products. See, for example, U.S. Pat. No. 5,429,493.

Co-injection molding of materials is well known. A co-injection molding apparatus injects two different plastic materials, typically an inner core material and an outer shell material, into a single mold cavity. A co-injection manifold receives material from two different injection machines and combines the two materials into a single stream which flows into a mold or die.

Co-injection processes create a product which is less expensive. A smaller amount of the more expensive outer plastic material is used for the final part, since it only is used for the outer surface or shell of the product. The second material which is co-extruded is typically a less expensive plastic material and forms the inner non-visible core of the product. A co-injection manifold and process are shown, for example, in U.S. Pat. No. 4,376,625.

The core material and the shell material utilized in a co-injection apparatus often have different melting points. Prior art hot runner systems exhibit a great deal of heat transfer between the melt streams, disadvantageously reducing the efficiency of the co-injection molding process.

It is desirable, therefore, to provide an improved co-injection nozzle assembly that provides reduced heat transfer between the materials of the co-injection molding process.

SUMMARY OF THE INVENTION

The present invention concerns a gate adapter for use in a hot runner co-injection molding system that includes a hollow gate adapter body defining a gate outlet at a free end thereof. At least a pair of nozzle assemblies is disposed in the adapter body, each of nozzle assemblies having an end in fluid communication with a source of liquid extruded material and another end defining an outlet. At least a pair of nozzle passages is defined in the adapter body and the passages extend from the outlet of the associated nozzle assemblies to a passage outlet adjacent the gate outlet. A valve stem is disposed adjacent each of the passage outlets and is operable to selectively allow flow from the passage outlets to the gate outlet. The nozzle passages extend for a short predetermined distance within the adapter body.

In a typical co-injection process, the materials in the nozzles are different and have correspondingly different melting points. Heat transfer between the liquid materials hinders the efficiency of the co-injection process by reducing the temperature of the higher melt point material. By thermally isolating the materials from one another, the gate adapter in accordance with the present invention greatly improves the efficiency of the co-injection process, as there is a negligible amount of heat transfer between the liquid materials because the short distance between the nozzle outlets and the mold cavity makes heat transfer between the materials an insignificant influence to the overall co-injection molding process.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 6 is a partial cross-sectional schematic view of an alternative embodiment of a co-injection nozzle assembly in accordance with the present invention;

DESCRIPTION OF THE PREFERRED EMBODIMENT

Figure 1:
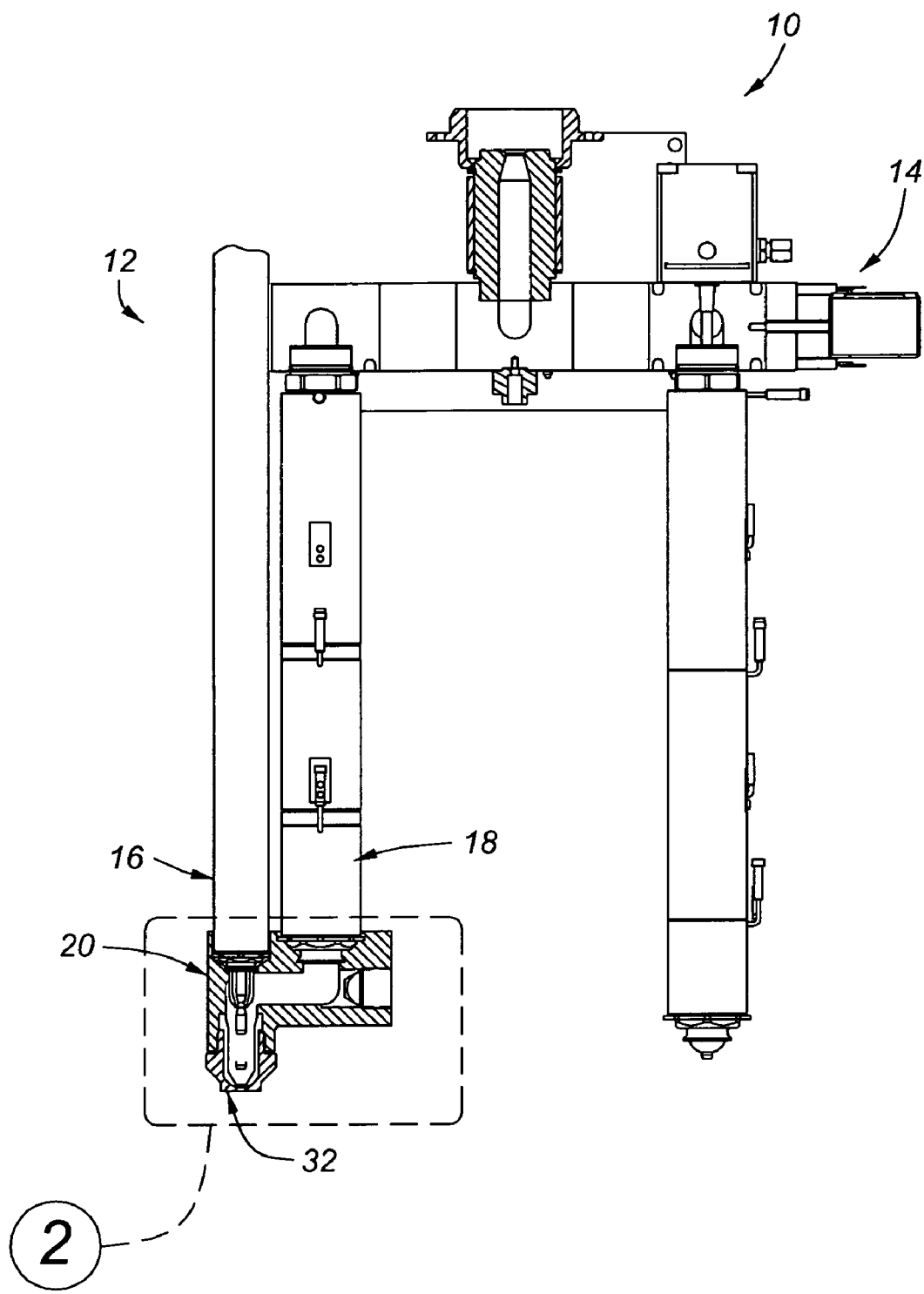
FIG. 1 is a partial cross-sectional schematic view of a co-injection molding system in accordance with the present invention.
Figure 2:
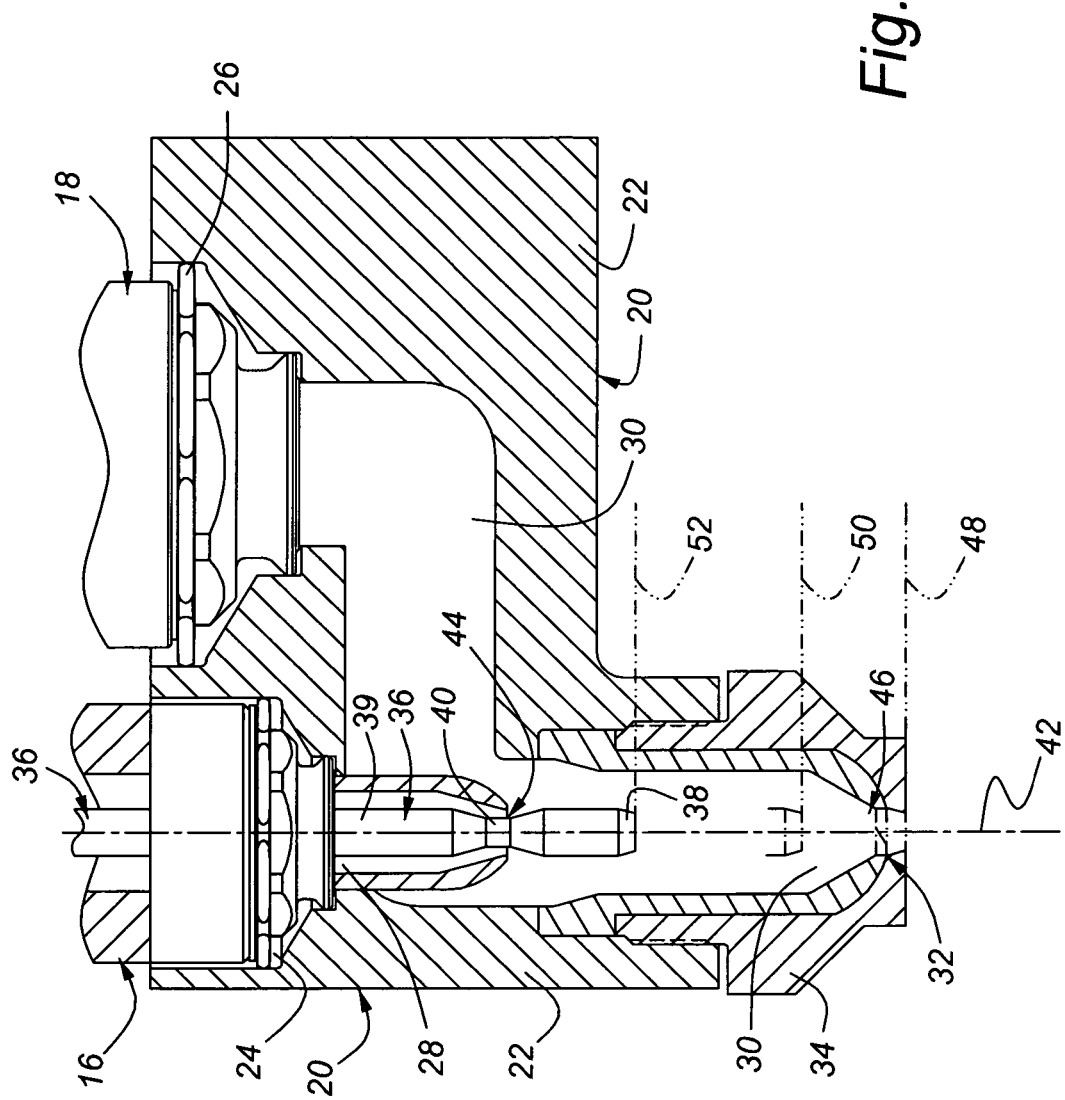
FIG. 2 is a partial cross-sectional schematic view in an enlarged scale of the encircled portion 2 in FIG. 1.

Referring now to FIGS. 1-2, there is shown a hot runner co-injection molding system, indicated generally at 10. The system 10 includes a first co-injection assembly 12 and a second co-injection assembly 14. Those skilled in the art will appreciate that one or more co-injection assemblies, such as the assemblies 12 and 14, may be utilized while remaining within the scope of the present invention. The first co-injection assembly 12 includes a first nozzle assembly 16 and at least a second nozzle assembly 18. Preferably, an end of the first nozzle assembly 16 is in fluid communication with a supply of a first melted plastic material (not shown) and an opposite end is disposed in a hollow gate adapter body 22 of a gate adapter 20. Similarly, an end of the second nozzle assembly 18 is preferably in fluid communication with a supply of a second extruded/melted plastic material (not shown) and an opposite end is disposed in the gate adapter body 22 of the gate adapter 20.

The end of the first nozzle assembly 16 in the gate adapter body 22 includes a first nozzle outlet 24 and the end of the second nozzle assembly 18 in the gate adapter body 22 includes a second nozzle outlet 26. The first nozzle outlet 24 and the second nozzle outlet 26 are preferably releasably attached to the first nozzle assembly 16 and the second nozzle assembly 18, respectively, such as by a threaded connection or the like. The first nozzle outlet 24 extends to a first nozzle passage 28 formed in the gate adapter body 22 and the second nozzle outlet 26 extends to a second nozzle passage 30 formed in the gate adapter body 22. The nozzle passages 28 and 30 extend for a short predetermined distance within the adapter body 22. The second nozzle passage 30 terminates in a second passage outlet 46 formed in the gate adapter body 22 adjacent a gate outlet 32 defined in a gate body 34 that is attached to the gate adapter body 22. The gate outlet 32 is in fluid communication with a mold cavity, such as a mold 204 shown schematically in FIG. 5. The gate body 34 is preferably releasably attached to the gate adapter body 22, such as by a threaded connection or the like. The first nozzle passage 28 terminates in a first passage outlet 44 defined within the second nozzle passage 30.

Figure 5:
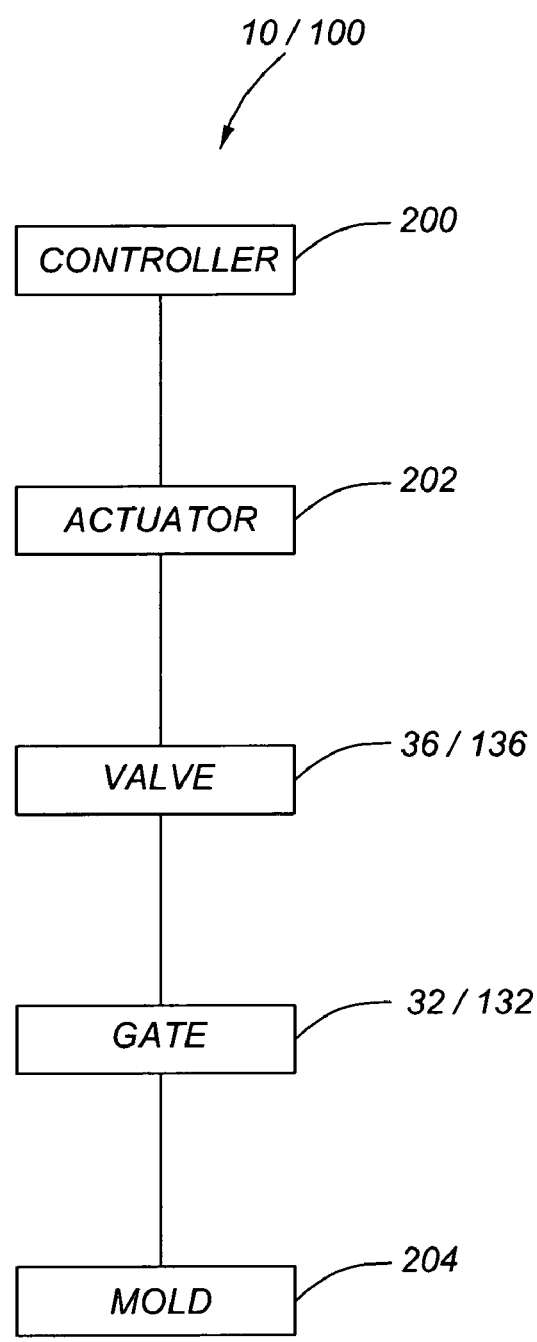
FIG. 5 is a block diagram of a control system for the systems of FIGS. 1-4.

The first co-injection assembly 12 includes an elongated valve stem 36 having an end seat 38, an elongated body portion 39, and an intermediate portion 40 having a smaller diameter than the body portion 39. The valve stem 36 is movable along a longitudinal axis 42 that extends through the first nozzle assembly 16. An actuator, such as an actuator 202 shown schematically in FIG. 5, is operable to move the valve stem 36 along the axis 42 between a first valve position indicated by a line 48, a second valve position indicated by a line 50 and a third valve position indicated by a line 52. The actuator 202 of the valve stem 36 may be, but is not limited to, a solenoid, a hydraulic actuator, a pneumatic actuator, an electric stepper motor, or the like. In the first valve position 48, the end seat 38 cooperates with the second passage outlet 46 and the body portion 39 cooperates with the first passage outlet 44. In the second valve position, the end seat 38 is located remote from the second passage outlet 46 and the body portion 39 continues to cooperate with the first passage outlet 44. In the third valve position, the end seat 38 is located remote from the second passage outlet 46 and the intermediate portion 40 is located adjacent the first passage outlet 44.

In operation, each of the co-injection assemblies 12 and 14 is supplied with liquid material, such as extrudate supplied from separate extruders (not shown) or the like. The nozzles 16 and 18 are filled with the liquid material, which flows to the nozzle outlets 24 and 26 and eventually to the nozzle passages 28 and 30. Actuation of the valve stem 36, discussed in more detail below, allows the liquid material to flow from the nozzle passages 28 and 30 through the passage outlets 44 and 46 and the gate 32 and eventually to the mold cavity 204.

Upon a signal from a controller, such as a controller 200 shown schematically in FIG. 5, or the like, the actuator 202 is operable to move the valve stem 36 between the first position 48, the second position 50, and the third position 52. In the first position 48, wherein the end seat 38 cooperates with the second passage outlet 46 and the body portion 39 cooperates with the first passage outlet 44, there is no flow from either of the nozzles 16 and 18 to the gate 32. In the second position 50, wherein the end seat 38 is located remote from the second passage outlet 46 and the body portion 39 continues to cooperate with the first passage outlet 44, liquid material in the second nozzle 18 may flow through the passage 30 and the passage outlet 46 to the gate 32 and thus to the mold. In the second position 50, the body portion 39 prevents liquid from flowing out of the first nozzle passage 28 through the passage outlet 44. In the third position 52, liquid material in the second nozzle 18 may flow through the passage 30 and the passage outlet 46 to the gate 32 and liquid material in the first nozzle 16 may flow through the passage 28 and the passage outlet 44 to the passage 30 and eventually to the gate 32. In the third position, wherein the end seat 38 is located remote from the second passage outlet 46 and the intermediate portion 40 is located adjacent the first passage outlet 44, liquid material from each of the nozzles 16 and 18 flows through the passage 30, out of the gate 32, and into the mold, forming a co-injection molded part, in a manner well known in the art.

Advantageously, the liquid materials in the nozzles 16 and 18 are thermally isolated from one another from the extruders to the nozzles passages 28 and 30. In a typical co-injection process, the materials in the nozzles 16 and 18 are different (such as for a core portion of the co-injection molded part and for a skin portion of the co-injection molded part) and have correspondingly different melting points. Heat transfer between the liquid materials hinders the efficiency of the co-injection process by reducing the temperature of the higher melt point material. Temperature control of the materials, therefore, is desirable. By thermally isolating the materials from one another, the efficiency of the co-injection process is greatly improved. There is a negligible amount of heat transfer between the liquid materials because of the short distance of the nozzle passages 28 and 30 between the nozzle outlets 24 and 26 to the gate 32. Thus, heat transfer between the materials is an insignificant influence to the overall co-injection molding process.

In addition, those skilled in the art will appreciate that the gate adapter 20 may be advantageously utilized with more than two injection molded materials supplied by a corresponding number of nozzle assemblies, such as the nozzles assemblies 16 and 18, while remaining within the scope of the present invention.

Figure 3:
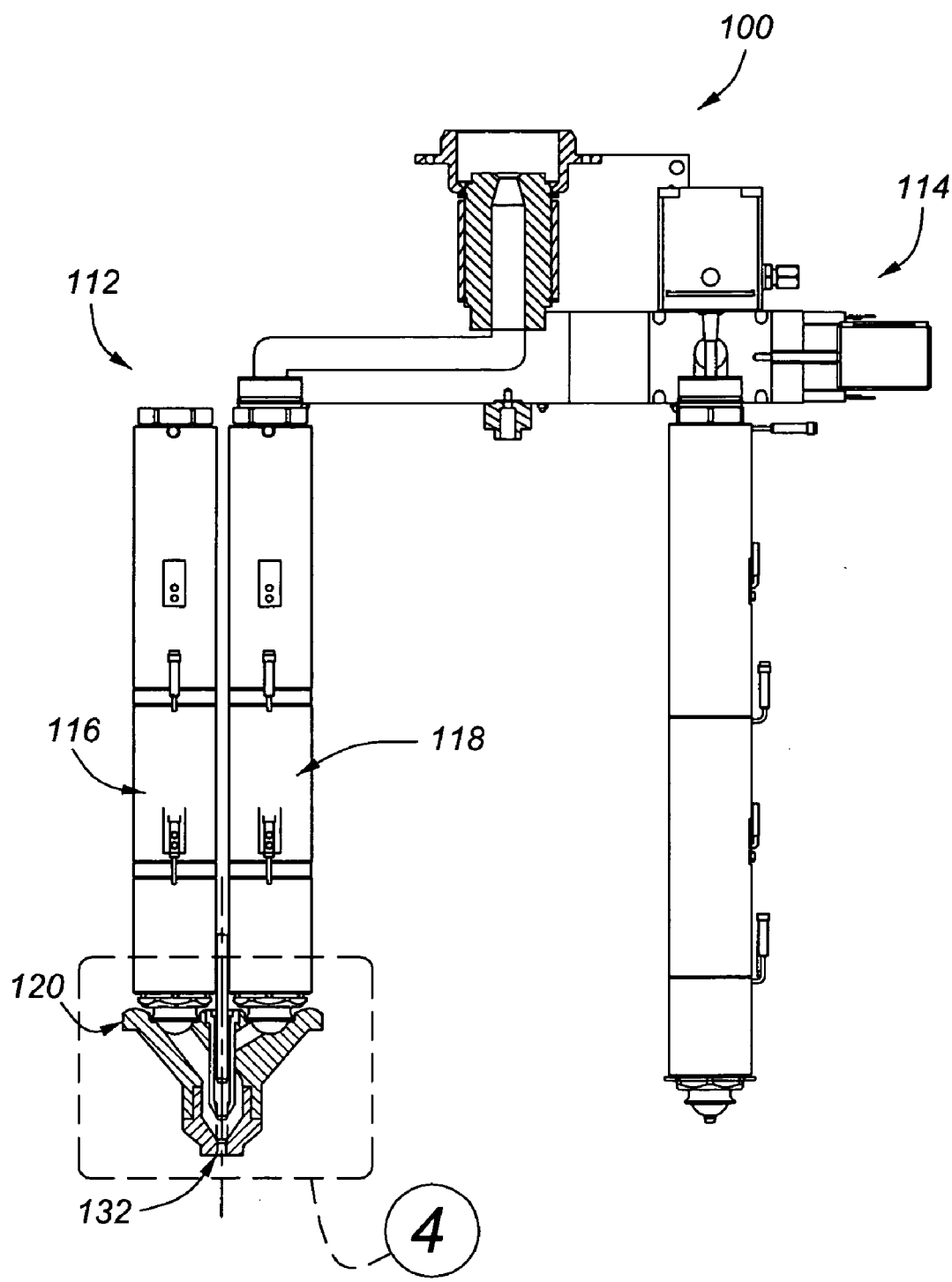
FIG. 3 is a partial cross-sectional schematic view of an alternative embodiment of a co-injection molding system in accordance with the present invention.
Figure 4:
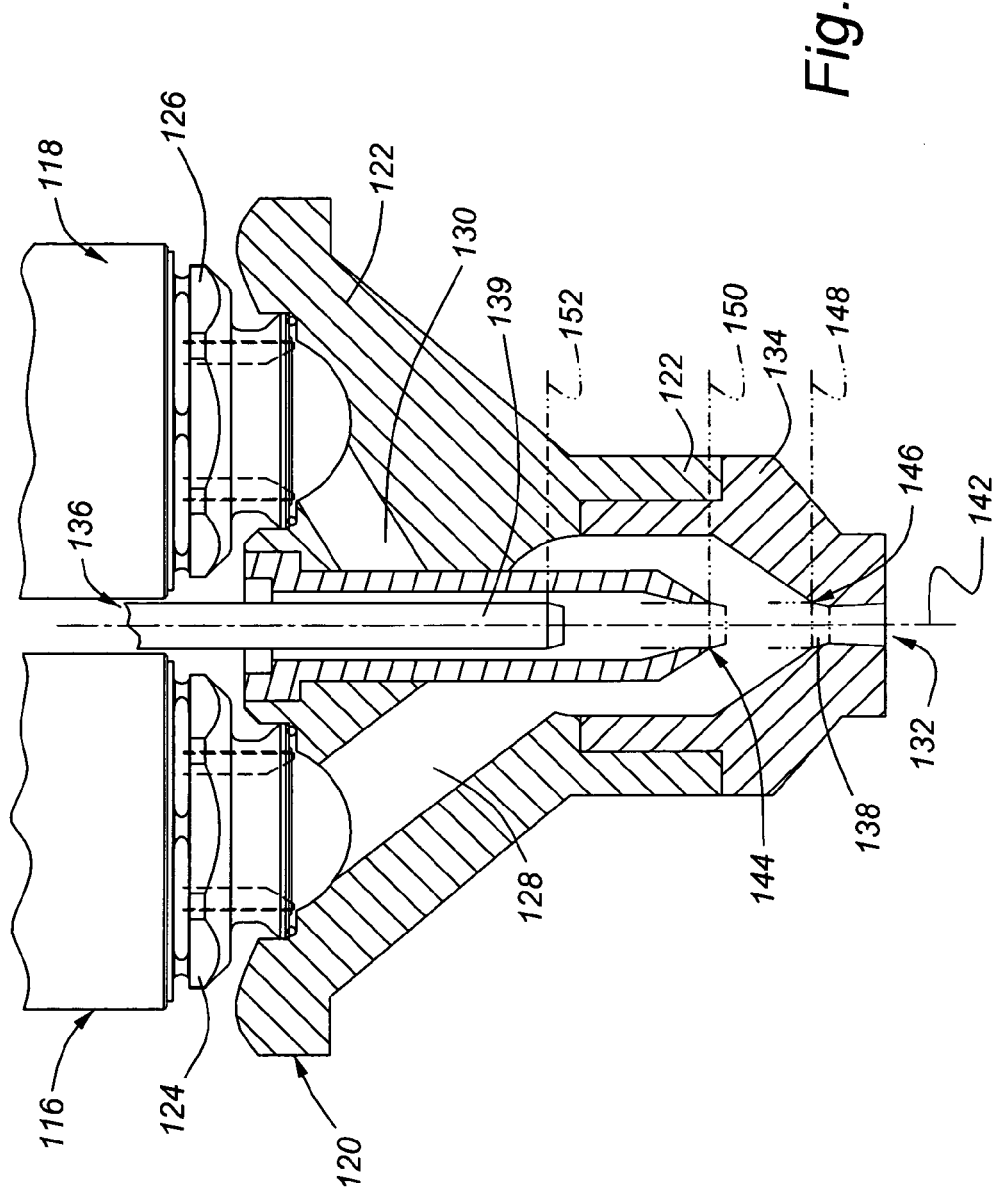
FIG. 4 is a partial cross-sectional schematic view in an enlarged scale of the encircled portion 4 in FIG. 3.

Referring now to FIG. 3-4, there is shown an alternative embodiment of a hot runner co-injection molding system, indicated generally at 100. The system 100 includes a first co-injection assembly 112 and a second co-injection assembly 114. Those skilled in the art will appreciate that one or more co-injection assemblies, such as the assemblies 112 and 114, may be utilized while remaining within the scope of the present invention. The first co-injection assembly 112 includes a first nozzle assembly 116 and at least a second nozzle assembly 118. Preferably, an end of the first nozzle assembly 116 is in fluid communication with a supply of a first melted plastic material (not shown) and an opposite end is disposed in a hollow gate adapter body 122 of a gate adapter 120. Similarly, an end of the second nozzle assembly 118 is preferably in fluid communication with a supply of a second extruded/melted plastic material (not shown) and an opposite end is disposed in the gate adapter body 122 of the gate adapter 120.

The end of the first nozzle assembly 116 in the gate adapter body 122 includes a first nozzle outlet 124 and the end of the second nozzle assembly 118 in the gate adapter body 122 includes a second nozzle outlet 126. The first nozzle outlet 124 and the second nozzle outlet 126 are preferably releasably attached to the first nozzle assembly 116 and the second nozzle assembly 118, respectively, such as by a threaded connection or the like. The first nozzle outlet 124 extends to a first nozzle passage 128 formed in the gate adapter body 122 and the second nozzle outlet 126 extends to a second nozzle passage 130 formed in the gate adapter body 122. The nozzle passages 128 and 130 extend for a short predetermined distance within the adapter body 22. The first nozzle passage 128 terminates in a first passage outlet 146 formed in the gate adapter body 122 adjacent a gate outlet 132 defined in a gate body 134 that is attached to the gate adapter body 122. The gate outlet 132 is in fluid communication with a mold cavity, such as the mold 204 shown schematically in FIG. 5. The gate body 134 is preferably releasably attached to the gate adapter body 122, such as by a threaded connection or the like. The second nozzle passage 130 terminates in a second passage outlet 144 defined within the first nozzle passage 128.

The first co-injection assembly 112 includes an elongated valve stem 136 having an end seat 138 and an elongated body portion 139. The valve stem 136 is movable along a longitudinal axis 142 that extends between the first nozzle assembly 116 and the second nozzle assembly 118. An actuator, such as the actuator 202 shown schematically in FIG. 5, is operable to move the valve stem 136 along the axis 142 between a first valve position indicated by a line 148, a second valve position indicated by a line 150 and a third valve position indicated by a line 152. The actuator 202 of the valve stem 136 may be, but is not limited to, a solenoid, a hydraulic actuator, a pneumatic actuator, an electric stepper motor, or the like. In the first valve position, the end seat 138 cooperates with the first passage outlet 146 and the body portion 139 cooperates with the second passage outlet 144. In the second valve position, the end seat 138 is located remote from the first passage outlet 146 and the body portion 139 continues to cooperate with the second passage outlet 144. In the third valve position, the end seat 138 is located remote from the first passage outlet 146 and the second passage outlet 144.

In operation, each of the co-injection assemblies 112 and 114 is supplied with liquid material, such as extrudate supplied from separate extruders (not shown) or the like. The nozzles 116 and 118 are filled with the liquid material, which flows to the nozzle outlets 124 and 126 and eventually to the nozzle passages 128 and 130. Actuation of the valve stem 136, discussed in more detail below, allows the liquid material to flow from the nozzle passages 128 and 130 through the passage outlets 144 and 146 and the gate 132 and eventually to the mold cavity 204.

Upon a signal from a controller, such as the controller 200 shown schematically in FIG. 5, or the like, the actuator 202 is operable to move the valve stem 136 between the first position 148, the second position 150, and the third position 152. In the first position 148, wherein the end seat 138 cooperates with the first passage outlet 146 and the body portion 139 cooperates with the second passage outlet 144, there is no flow from either of the nozzles 116 and 118 to the gate 132. In the second position 150, wherein the end seat 138 is located remote from the first passage outlet 146 and the body portion 139 continues to cooperate with the second passage outlet 144, liquid material in the second nozzle 118 may flow through the passage 128 and the passage outlet 146 to the gate 132 and thus the mold. In the second position 150, the body portion 139 prevents liquid from flowing out of the first nozzle passage 128 through the passage outlet 144. In the third position 152, liquid material in the second nozzle 118 may flow through the passage 130 and the passage outlet 144 to the gate 132 and liquid material in the first nozzle 116 may flow through the passage 128 and the passage outlet 146 to the passage 130 and eventually to the gate 132. In the third position, wherein the end seat 138 is located remote from the first passage outlet 146 and the second passage outlet 144, liquid material from each of the nozzles 116 and 118 flows through the passage 130, out of the gate 132, and into the mold, forming a co-injection molded part, in a manner well known in the art.

Advantageously, the liquid materials in the nozzles 116 and 118 are thermally isolated from one another from the extruder to the nozzles passages 128 and 130. In a typical co-injection process, the materials in the nozzles 116 and 118 are different (such as for a core portion of the co-injection molded part and for a skin portion of the co-injection molded part) and have correspondingly different melting points. Heat transfer between the liquid materials hinders the efficiency of the co-injection process by reducing the temperature of the higher melt point material. Temperature control of the materials, therefore, is desirable. By thermally isolating the materials from one another, the efficiency of the co-injection process is greatly improved, as there is a negligible amount of heat transfer between the liquid materials. The short distance of the nozzle passages 128 and 130 between the nozzle outlets 124 and 126 and the gate 132 makes heat transfer between the materials an insignificant influence to the overall co-injection molding process.

In addition, those skilled in the art will appreciate that the gate adapter 120 may be advantageously utilized with more than two injection molded materials supplied by a corresponding number of nozzle assemblies, such as the nozzles assemblies 116 and 118, while remaining within the scope of the present invention.

Referring now to FIG. 5, there is shown a schematic view of the hot runner systems 10 and 100. The systems 10 and 100 include the controller 200 in communication with the actuator 202. The actuator 202 actuates the valves 36 or 136 which allow flow to the gates 32 or 132, as shown in FIGS. 1-4. The gates 32 or 132, in turn allow flow into the mold 204, such as a mold cavity or the like.

Referring now to FIG. 6 and 7a-7c, there is shown an alternative embodiment of a co-injection nozzle assembly, indicated generally at 312. The co-injection nozzle assembly 312 can be utilized with a hot runner system in accordance with the present invention such as, for example, the systems 10 or 100, including another co-injection nozzle assembly, similar to the co-injection nozzle assemblies 12 and 14 shown in FIG. 1. The co-injection assembly 312 includes a first nozzle assembly 316 and at least a second nozzle assembly 318. Preferably, an end of the first nozzle assembly 316 is in fluid communication with a supply of a first melted plastic material (not shown) and an opposite end is disposed in a hollow gate adapter body 322 of a gate adapter 320. Similarly, an end of the second nozzle assembly 318 is preferably in fluid communication with a supply of a second extruded/melted plastic material (not shown) and an opposite end is disposed in the gate adapter body 322 of the gate adapter 320.

The end of the first nozzle assembly 316 in the gate adapter body 322 includes a first nozzle outlet 324 and the end of the second nozzle assembly 318 in the gate adapter body 322 includes a second nozzle outlet 326. The first nozzle outlet 324 and the second nozzle outlet 326 are preferably releasably attached to the first nozzle assembly 316 and the second nozzle assembly 318, respectively, such as by a threaded connection or the like. The first nozzle outlet 324 extends to a first nozzle passage 328 formed in the gate adapter body 322 and the second nozzle outlet 326 extends to a second nozzle passage 330 formed in the gate adapter body 322. The nozzle passages 328 and 330 extend for a short predetermined distance within the adapter body 322. The nozzle passages 328 and 330 are in selective fluid communication with a gate outlet 332 defined in a gate body 334 that is attached to the gate adapter body 322, discussed in more detail below. The gate outlet 332 is in fluid communication with a mold cavity, such as a mold 204 shown schematically in FIG. 5. The gate body 334 is preferably releasably attached to the gate adapter body 322, such as by a threaded connection or the like.

The co-injection assembly 312 includes an elongated valve stem 314 surrounded by a rotatable sleeve 336 having a lower portion 338, an upper portion 339, and an intermediate portion 340 between the portions 338 and 339. A port 341 is formed in a wall of the intermediate portion 340 of the sleeve 336 extends for a predetermined arcuate distance along the circumference. The end portion 338 includes an outlet 338a in fluid communication with the gate outlet 332. The sleeve 336 is rotatable about a longitudinal axis 342 that extends between the first nozzle assembly 316 and the second nozzle assembly 318. A bushing 343 is disposed in the gate adapter body 322 and rotatably retains the sleeve 336 in the gate adapter body 322.

Figure 7A:
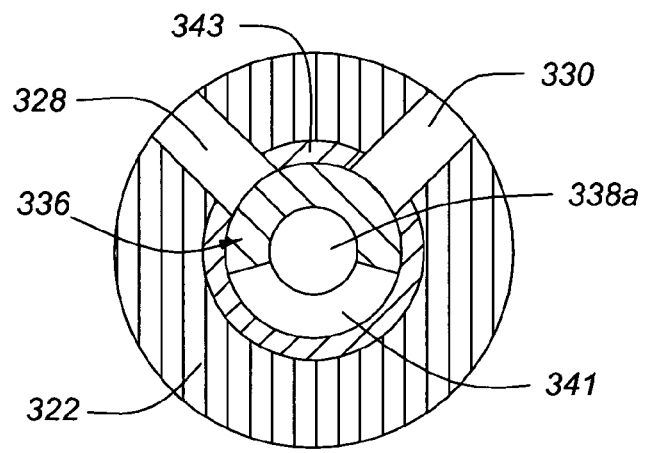
FIG. 7a is a cross-sectional view taken along line 7-7 in FIG. 6 with the valve stem of the co-injection nozzle assembly in a first valve position.
Figure 7B:
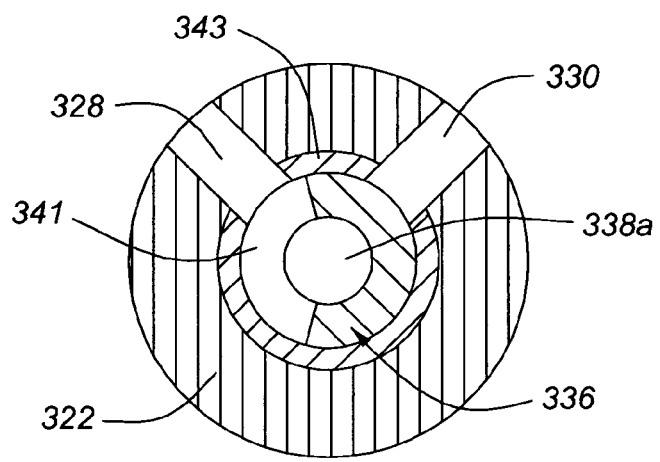
FIG. 7b is a cross-sectional view taken along line 7-7 in FIG. 6 with the valve stem of the co-injection nozzle assembly in a second valve position.
Figure 7C:
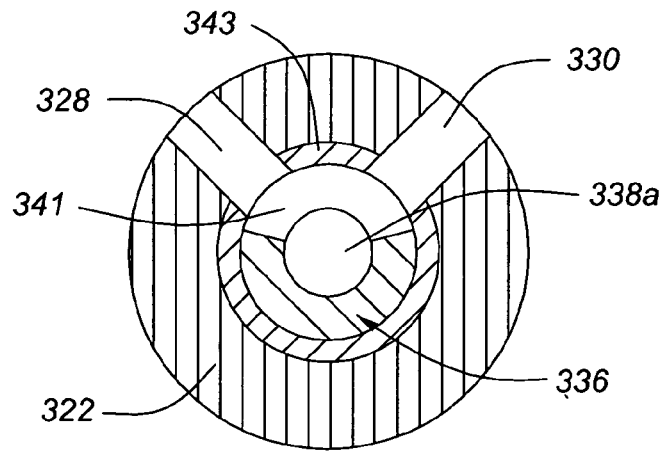
FIG. 7c is a cross-sectional view taken along line 7-7 in FIG. 6 with the valve stem of the co-injection nozzle assembly in a third valve position.

An actuator, such as an actuator 202 shown schematically in FIG. 5, is operable to rotate the sleeve 336 about the axis 342 between a first valve position shown in FIG. 7a, a second valve position shown in FIG. 7b and a third valve position shown in FIG. 7c. The actuator 202 of the sleeve 336 may be, but is not limited to, a solenoid, a hydraulic actuator, a pneumatic actuator, an electric stepper motor, or the like. In the first valve position, the valve stem port 341 is disposed remote from the first nozzle passage 328 and the second nozzle passage 330 and the solid wall of the intermediate portion 340 of the sleeve 336 covers the first nozzle passage 328 and the second nozzle passage 330. In the second valve position, the valve stem port 341 is disposed adjacent the first nozzle passage 328 and the solid wall of the intermediate portion 340 of the sleeve 336 covers the second nozzle passage 330. In the third valve position, the valve stem port 341 is disposed adjacent the first nozzle passage 328 and the second nozzle passage 330. Best seen in FIGS. 7a-7c, the nozzle passages 328 and 330 are disposed approximately sixty degrees apart from one another along the circumference of the gate adapter body 322. The valve stem port 341 extends for at least sixty degrees along the circumference of the sleeve 336 but at least a sufficient distance to uncover each of the passages 328 and 330 when in the third valve position of FIG. 7c. Those skilled in the art will appreciate that the distances and degrees of the passages 328 and 330 and the port 341 may be varied while remaining within the scope of the present invention.

In operation, the co-injection assembly 312 is supplied with liquid material, such as extrudate supplied from separate extruders (not shown) or the like. The nozzles 316 and 318 are filled with the liquid material, which flows to the nozzle outlets 324 and 326 and eventually to the nozzle passages 328 and 330. Between injection operations, the valve stem 314 is moved downwardly from the position shown to seal the gate outlet 332. Actuation of the valve stem 314 upwardly to the position shown and actuation of the sleeve 336, discussed in more detail below, allows the liquid material to flow from the nozzle passages 328 and 330 through the valve stem port 341, the valve stem outlet 338a and the gate 332 and eventually to the mold cavity 204.

Upon a signal from a controller, such as a controller 200 shown schematically in FIG. 5, or the like, the actuator 202 is operable to move the rotatable sleeve 336 between the first valve position, the second valve position, and the third valve position. In the first position, wherein the valve stem port 341 is disposed remote from the first nozzle passage 328 and the second nozzle passage 330 and the intermediate portion 340 of the sleeve 336 covers the first nozzle passage 328 and the second nozzle passage 330, there is no flow from either of the nozzles 316 and 318 to the gate 332. In the second position, wherein the valve stem port 341 is disposed adjacent the first nozzle passage 328 and the solid wall of the intermediate portion 340 of the sleeve 336 covers the second nozzle passage 330, liquid material in the first nozzle 316 may flow through the passage 328, the valve stem port 341, and the valve stem outlet 338a to the gate 332 and thus the mold. In the second position, the solid wall of the intermediate portion 340 of the sleeve 336 prevents liquid from flowing out of the second nozzle passage 330 through the valve stem port 341. In the third valve position, liquid material in the first nozzle 316 may flow through the passage 328, the valve stem port 341, and the valve stem outlet 338a and eventually to the gate 332 and liquid material in the second nozzle 318 may flow through the passage 330 and the valve stem port 341, and the valve stem outlet 338a to the gate 332. In the third valve position, wherein the valve stem port 341 is disposed adjacent the first nozzle passage 328 and the second nozzle passage 330, liquid material from each of the nozzles 316 and 318 flows through the valve stem port 341, out of the gate 332, and into the mold, forming a co-injection molded part, in a manner well known in the art.

Advantageously, the liquid materials in the nozzles 316 and 318 are thermally isolated from one another from the extruder to the nozzles passages 328 and 330. In a typical co-injection process, the materials in the nozzles 316 and 318 are different (such as for a core portion of the co-injection molded part and for a skin portion of the co-injection molded part) and have correspondingly different melting points. Heat transfer between the liquid materials hinders the efficiency of the co-injection process by reducing the temperature of the higher melt point material. Temperature control of the materials, therefore, is desirable. By thermally isolating the materials from one another, the efficiency of the co-injection process is greatly improved, as there is a negligible amount of heat transfer between the liquid materials. The short distance of the nozzle passages 328 and 330 between the nozzle outlets 324 and 326 and the gate 332 makes heat transfer between the materials an insignificant influence to the overall co-injection molding process.

In addition, those skilled in the art will appreciate that the gate adapter 320 may be advantageously utilized with more than two injection molded materials supplied by a corresponding number of nozzle assemblies, such as the nozzles assemblies 316 and 318, while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for use in a hot runner co-injection molding system, comprising:
a gate adaptor body having at least a pair of nozzle passages formed therein, including a first nozzle passage and a second nozzle passage, each of said nozzle passages having a passage outlet in fluid communication with a gate outlet;
at least a pair of nozzle assemblies mounted in said adaptor body, each said nozzle assembly having an end in fluid communication with a source of liquid extruded material and a nozzle outlet in fluid communication with an associated one of said nozzle passages
an elongated fixed sleeve disposed in said adapter body and having an inside and an outside, said inside of said elongated sleeve being in fluid communication with said first nozzle passage, whereby at least a portion of said second nozzle passage is in fluid communication with said outside of said sleeve; and a valve stem being at least partially disposed in said elongated sleeve, said valve stem being reciprocatingly movable within said elongated sleeve, said valve stem being operable to selectively: i) prevent material flow through each of said first nozzle passage and said second nozzle passage: ii) prevent material flow through said first nozzle passage while allowing material flow through said second nozzle passage: and iii) allow material flow through each of said first nozzle passage and said second nozzle passage to said gate outlet, wherein a length of each of said nozzle passages in said adapter body is selected to minimize heat transfer between the materials in said nozzle passages.

2. The apparatus according to claim 1 wherein said valve stem is disposed within a one of the nozzle assemblies.

3. The apparatus according to claim 1 wherein said valve stem is disposed intermediate said at least two nozzle assemblies.

4. The apparatus according to claim 1 wherein said nozzle passages are thermally insulated from one another within said adapter body.

5. The apparatus according to claim 1 wherein said length of each said nozzle passage is selected to produce negligible heat transfer between the materials in said nozzle passages.

6. The apparatus according to claim 1 including an actuator attached to said valve stem for selectively controlling material flow from said passage outlets to said gate outlet.

7. The apparatus according to claim 6 wherein said actuator is a one of a solenoid, a hydraulic actuator, a pneumatic actuator, and an electric stepper motor.

8. The apparatus according to claim 1 including a gate body releasably attached to said adapter body and having said gate outlet formed therein.

9. The apparatus according to claim 1 wherein said valve stem includes an end seat and a reduced diameter intermediate portion.

10. The apparatus according to claim 9 wherein said end seat cooperates with a one of said passage outlets and said body portion cooperates with another of said passage outlets in a first valve position of said valve stem to prohibit material flow from said passage outlets to said gate outlet.

11. The apparatus according to claim 1 wherein said valve stem is one of linearly actuated and rotatably actuated between three operating positions.

12. An apparatus for use in a co-injection molding system, comprising:

a gate adapter body having at least a pair of nozzle passages formed therein, including a first nozzle passage and a second nozzle passage, each extending between an inlet and a passage outlet;

at least a pair of nozzle assemblies mounted in said adapter body, each of said nozzle assemblies being in fluid communication with a source of liquid extruded material and having a nozzle outlet in fluid communication with an associated one of said nozzle passage inlets;

a gate body releasably attached to said adapter body and forming a gate outlet in fluid communication with said passage outlets an elongated fixed sleeve disposed in said adapter body and having an inside and an outside, said inside of said elongated sleeve being in fluid communication with said first nozzle passage, whereby at least a portion of said second nozzle passage is in fluid communication with said outside of said sleeve; and a valve stem being at least partially disposed in said elongated sleeve, said valve stem being reciprocatingly movable within said elongated sleeve, said valve stem being operable to selectively: i) prevent material flow through each of said first nozzle passage and said second nozzle passage; ii) prevent material flow through said first nozzle passage while allowing material flow through said second nozzle passage; and iii) allow material flow through each of said first nozzle passage and said second nozzle passage to said gate outlet, wherein a length of said of said nozzle passages is selected to minimize heat transfer between the materials in said nozzle passages.

13. The apparatus according to claim 12 wherein said valve stem has a body including an end seat and a reduced diameter intermediate portion.

14. The apparatus according to claim 13 wherein said end seat cooperates with a one of the passage outlets and said body cooperates with another of said passage outlets in a first valve position to block material flow to said gate outlet.

15. The apparatus according to claim 12 wherein said valve stem is one of linearly actuated and rotatably actuated between valve operation positions.

16. An apparatus for use in a co-injection molding system, comprising:

a gate adapter body including at least a pair of nozzle passages formed therein, including a first nozzle passage and a second nozzle passage, each said nozzle passage having an inlet end in fluid communication with a passage outlet;

an elongated fixed sleeve disposed in said adapter body and having an inside and an outside, said inside of said elongated sleeve being in fluid communication with said first nozzle passage, whereby at least a portion of said second nozzle passage is in fluid communication with said outside of said sleeve; and a valve stem being at least partially disposed in said elongated sleeve, said valve stem being reciprocatingly movable within said elongated sleeve; and an actuator connected to said valve stem for selectively: i) preventing material flow through each of said first nozzle passage and said second nozzle passage: ii) preventing material flow through said first nozzle passage while allowing material flow through said second nozzle passage: and iii) allowing material flow through each of said first nozzle passage and said second nozzle passage to said gate outlet, wherein said nozzle passages are configured in length and spacing to minimize thermal transfer between materials in said nozzle passage.

17. The apparatus according to claim 16 wherein said actuator is a one of a solenoid, a hydraulic actuator, a pneumatic actuator, and an electric stepper motor.

18. The apparatus according to claim 16 wherein said actuator is a one of a liner actuator and a rotatable actuator.

19. The apparatus according to claim 16 wherein a first one of said nozzle passages extends into a second one of said nozzle passages along a common axis shared by said inlet end of said first one of said nozzle passages.

20. The apparatus according to claim 16 wherein a fist one of said nozzle passages extends into a second one of said nozzle passages along a common axis, said inlet ends of said first and second ones of said nozzle passages being spaced from said common axis.

* * * * *